(12) United States Patent
Kvamsdal et al.

(10) Patent No.: US 11,229,917 B2
(45) Date of Patent: Jan. 25, 2022

(54) REVERSE FLOW CYCLONES

(71) Applicant: Schlumberger Technology Corp., Sugar Land, TX (US)

(72) Inventors: Dag Kvamsdal, Houston, TX (US); Pinkesh R. Sanghani, Houston, TX (US); Ankur D. Jariwala, Katy, TX (US); Luis Eduardo Caires-Fernandez, Cypress, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 208 days.

(21) Appl. No.: 16/453,042

(22) Filed: Jun. 26, 2019

(65) Prior Publication Data

US 2020/0001309 A1 Jan. 2, 2020

Related U.S. Application Data

(60) Provisional application No. 62/690,506, filed on Jun. 27, 2018, provisional application No. 62/692,420, filed on Jun. 29, 2018.

(51) Int. Cl.
*B04C 5/081* (2006.01)
*B01D 19/00* (2006.01)
(Continued)

(52) U.S. Cl.
CPC .......... *B04C 5/081* (2013.01); *B01D 19/0057* (2013.01); *B01D 45/02* (2013.01); *B01D 45/16* (2013.01); *B01D 45/18* (2013.01); *B04C 3/06* (2013.01); *B04C 5/06* (2013.01); *B04C 5/08* (2013.01); *B04C 5/14* (2013.01); *B04C 5/181* (2013.01); *B04C 5/24* (2013.01); *B04C 5/28* (2013.01); *B01D 53/24* (2013.01)

(58) Field of Classification Search
CPC .. B04C 5/081; B04C 5/08; B04C 5/28; B04C 5/06; B04C 5/181; B04C 5/14; B04C 5/24; B04C 3/06; B01D 45/12; B01D 45/14; B01D 45/06; B01D 45/08; B01D 45/02; B01D 45/16; B01D 45/18; B01D 19/0057; B01D 53/24
See application file for complete search history.

(56) References Cited

U.S. PATENT DOCUMENTS 7,279,020 B2  10/2007  Christiansen et al.
7,875,092 B2   1/2011  Christiansen et al.
(Continued)

*Primary Examiner* — Robert Clemente
*Assistant Examiner* — Hafiz Muhammad Aamir
(74) *Attorney, Agent, or Firm* — Helene Raybaud

(57) ABSTRACT

A separator apparatus is described for separating liquids and solids from a gas. The separator apparatus includes a reverse flow cyclone comprising a cylindrical section, a conical section, and a top, the cylindrical section having a feed inlet, the top having a gas outlet, and the conical section having a reject outlet at the bottom thereof. An axial cyclone is disposed in the cylindrical section, the axial cyclone oriented with a first end located proximate to the top of the apparatus and a second end opposite the first end, the axial cyclone having a tapered entrance fixture at the second end thereof and having a wall with a plurality of openings located between the first end of the axial cyclone and a midpoint of the axial cyclone. A drain plate is coupled to the cylindrical section below the openings of the axial cyclone.

20 Claims, 4 Drawing Sheets

(51) Int. Cl.

| | |
|---|---|
| *B04C 5/14* | (2006.01) |
| *B04C 5/24* | (2006.01) |
| *B01D 53/24* | (2006.01) |
| *B01D 45/16* | (2006.01) |
| *B01D 45/18* | (2006.01) |
| *B01D 45/02* | (2006.01) |
| *B04C 5/06* | (2006.01) |
| *B04C 5/08* | (2006.01) |
| *B04C 5/28* | (2006.01) |
| *B04C 3/06* | (2006.01) |
| *B04C 5/181* | (2006.01) |

(56) References Cited

U.S. PATENT DOCUMENTS

| | | |
|---|---|---|
| 7,876,103 B2 | 1/2011 | Mueller |
| 7,998,251 B2* | 8/2011 | Pondelick .............. B01D 45/16 95/258 |
| 8,940,067 B2 | 1/2015 | Mueller |
| 9,266,042 B2 | 2/2016 | Kvamsdal et al. |
| 2001/0042283 A1* | 11/2001 | Oh ............................ A47L 5/28 15/353 |
| 2007/0163442 A1* | 7/2007 | Saito ........................ B04C 5/13 96/209 |
| 2014/0116255 A1 | 5/2014 | Perez Guerra et al. |

\* cited by examiner

REVERSE FLOW CYCLONES

CROSS-REFERENCE TO RELATED APPLICATIONS

This patent application claims benefit of U.S. Provisional Patent Application Ser. No. 62/690,506 filed Jun. 27, 2018, which is incorporated herein by reference.

FIELD

Embodiments of the present invention generally relate to a gas separator apparatus. Specifically, cyclone gas separators are described herein.

BACKGROUND

Cyclone separators are commonly used to separate gases from solids and liquids. The gas and entrained solids or liquids can flow in the same direction, in which case the cyclone is called an "axial cyclone." The gas and entrained solids or liquids can flow in opposite directions, in which case the cyclone is called a "reverse flow" cyclone, because the gas exits in a direction "reverse" to the direction of the solids or liquids. In reverse flow cyclones, the feed is provided to the unit in a cylindrical section thereof in a tangential flow direction. The mixture vortexes around the wall of the cylindrical section where the solids or liquids separate from the gas. In a vertically oriented cyclone, the solids or liquids fall under the influence of gravity. Below the cylindrical section, a conical section is provided that compresses the flow of gases and solids or liquids into a tighter circumference as the material flows downward. Gases, near the rotational center, become pressured toward the decreasing diameter and begin to flow upward while the solids or liquids ultimately exit the bottom of the conical section. The gases eventually exit the top of the unit.

Because cyclones differentiate materials by density, material fractions having higher bulk density will collect along the walls of the cyclone, while materials having lower bulk density will move toward the center of the cyclone. Thus, gases collect at the center. Near the center of rotation, however, fine particles or liquid droplets (mist) collect. Larger particle or droplet sizes collect at increasing radii from the center. As gas rises in the reverse flow cyclone, some fine particles or liquid droplets can be entrained in the flow and can exit the top of the unit with the gas.

To prevent transient entrainment of larger particles in the gas effluent, a vortex finder is sometimes used. The vortex finder is a cylindrical feature disposed in the cylindrical section of the reverse flow cyclone extending from near the top of the unit, where the gas effluent exits, down toward the conical section of the unit. The vortex finder provides a cut-point in particle size separated by the unit. The diameter of the vortex finder determines the size of particles allowed to rise inside the vortex finder with the gas. As the total flow through the unit increases, the excess of fine particles in the gas effluent typically increases, and larger particles converge toward the center. More large particles find their way into the vortex finder, indicating an optimal separation capacity of the unit. In some cases, the optical separation capacity of the unit can be increased by adding a filter to the gas effluent stream. The filters need changing, however, requiring operators to have spare filter elements on hand. There is a need for an improved cyclone separator.

SUMMARY

Some embodiments described herein provide a separator apparatus, comprising a reverse flow cyclone comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof; an axial cyclone disposed in the cylindrical section, the axial cyclone oriented with a first end located proximate to the top and a second end opposite the first end, the axial cyclone having a tapered entrance fixture at the second end and having a wall with a plurality of openings located between the first end of the axial cyclone and a midpoint of the axial cyclone; and a drain plate coupled to the cylindrical section below the openings of the axial cyclone.

Other embodiments described herein provide a separator apparatus, comprising a reverse flow cyclone comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof; an axial cyclone insert disposed in the cylindrical section, the axial cyclone insert having a plurality of axial cyclones, each oriented with a first end located proximate to the top and a second end opposite the first end and having a tapered entrance fixture at the second end, and each having a wall with a plurality of openings located between the first end a midpoint of the axial cyclone; and a drain plate coupled to the cylindrical section below the openings of the axial cyclone.

Other embodiments described herein provide a separator apparatus, comprising a reverse flow cyclone comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof; an axial cyclone insert disposed in the cylindrical section, the axial cyclone insert having a plurality of axial cyclones, each oriented with a first end located proximate to the top and a second end opposite the first end and having a tapered entrance fixture at the second end, and each having a wall with a plurality of openings located between the first end a midpoint of the axial cyclone; a sloped drain plate coupled to the cylindrical section below the openings of the axial cyclone; and a support plate located between the feed inlet of the cylindrical section and the second ends of the axial cyclones, wherein the support plate supports the axial cyclone insert.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
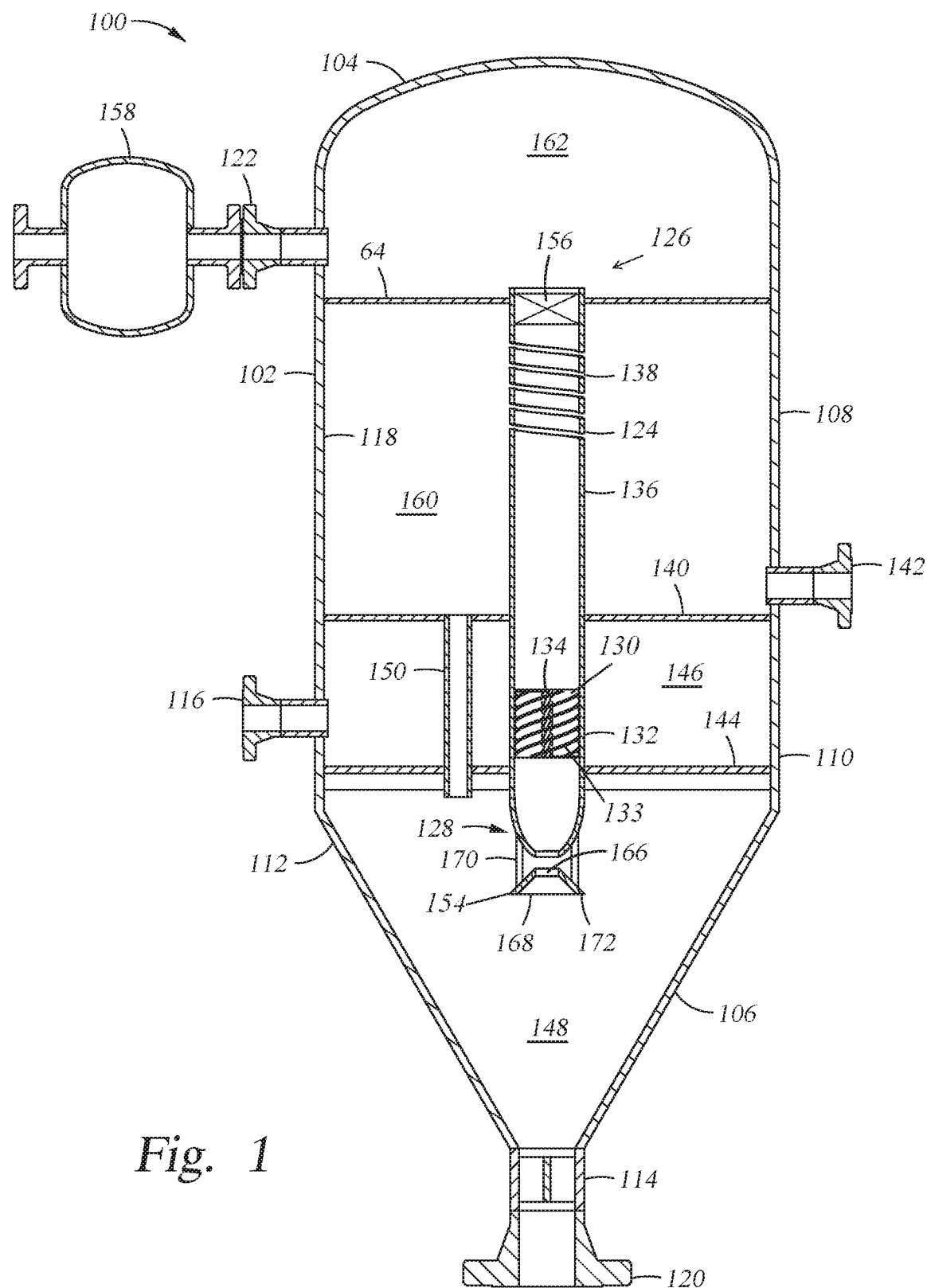
FIG. 1 is a cross-sectional view of a separation apparatus according to one embodiment.

FIG. 1 is a cross-sectional view of a separation apparatus 100 according to one embodiment. The apparatus 100 features a vessel 101 having a cylindrical section 102, a top 104, and a conical section 106. The cylindrical section 102 has a first end 108 and a second end 110. The conical section 106 has a first end 112 and a second end 114. The first end 112 has a first diameter and the second end 114 has a second diameter smaller than the first diameter. The first end 112 is connected to the second end 110 of the cylindrical section 102. Typically, the cylindrical section 102 has a diameter equal to the diameter of the first end 112, but in some cases the cylindrical section 102 can have a diameter greater than the diameter of the first end 112.

The top 104 is connected to the first end 108 of the cylindrical section 102. A feed inlet 116 is located in a sidewall 118 of the cylindrical section 102. A reject outlet 120 is located at the second end 114 of the conical section 106. A gas outlet 122 is located in the top 104. The gas outlet 122 may be coaxial with the reject outlet 120, or the gas outlet 122 may be in a side portion of the top 104, as shown here, for easier manufacture. For purposes of this application, the gas outlet 122 may be located at any point in the top 104. The top 104 typically has a maximum diameter, at the connection point with the first end 108 of the cylindrical section 102, that is the same as the diameter of the cylindrical section 102, but in some cases the maximum diameter of the top 104 can be smaller or larger than the diameter of the cylindrical section 102.

A reverse flow cyclone 124 is disposed in the separation apparatus 100. The reverse flow cyclone 124 is a cylindrical component with a first end 126 and a second end 128 opposite the first end 126. Most of the reverse flow cyclone 124 is disposed in the cylindrical section 102 of the apparatus 100. The first end 126 is located at or in the top 104 to release gas into the top 104. The second end 128 is located at or in the conical section 106 to accept gas separated from solids and liquids in the conical section 106. Here, the reverse flow cyclone 124 is positioned co-axially with the reject outlet 120 (i.e. co-axially with the vessel 101), but in other embodiments the reverse flow cyclone 124 may be offset from an axis of the reject outlet 120 and/or the vessel 101.

The reverse flow cyclone 124 has an optional rotation structure 130 disposed near the second end 128 thereof, for example between the second end 128 and a midpoint of the reverse flow cyclone 124, for inducing, or increasing, rotation of gas flowing into the reverse flow cyclone 124. The rotation structure 130 comprises a plurality of curved vanes 133 disposed between an outer wall 132 of the rotation structure 130 and an inner core 134 of the rotation structure 130. The vanes 133 may contact the outer wall 132 as shown here, or the vanes 133 may be spaced apart from the outer wall 132.

A flow section 136 is between the rotation structure 130, or second end 128, and the first end 126. Gas flows through the flow section 136 in a vortical pattern that separates higher density material, such as fine solid or liquid particles from lower density gas. The fine solid or liquid particles gather along the wall of the reverse flow cyclone 124 while the gas gathers near the center. The gas flows from the second end 128 to the first end 126 and emerges into the top 104.

The reverse flow cyclone 124 has a plurality of openings 138 near the first end 126 thereof, for example between a midpoint of the reverse flow cyclone 124 and the first end 126. Here, the openings 138 are all helical slits. In general, the plurality of openings 138 are all helical slits, horizontal slits, vertical slits, or holes. In some cases, a mixture of opening types may be used. Thus, each of the openings 138 can be a helical slit, a horizontal slit, a vertical slit, or a hole, and the openings 138 do not all have to be the same type of opening. In the embodiment of FIG. 1, the helical slits have constant pitch of 1.0 to 2.0, but any pitch, constant or varying, can be used for helical slits. Where horizontal slits are used, each slit may have the same length as every other slit, or different length slits may be used. Where vertical slits are used, each slit may have the same length as every other slit, or different length slits may be used. Where holes are used, each hole may have the same shape and dimension as every other hole, or different shapes, such as square, triangular, hexagonal, rectangular, and elongated oval, can be used. Different dimensions can also be used for the individual holes. Where holes are used, the holes may be arranged in rows and columns, or the holes may be offset to any degree, which may be constant or may vary.

The openings 138 allow residual liquid and solids moving up the axial cyclone 124 to escape without being re-entrained in the gas flow going toward the gas outlet 122. The liquid and solids that emerge through the openings 138 collect on a drain plate 140. The liquids and solids collecting on the drain plate 140 are drained through a drain passage 150 from the drain plate 140 to the conical section 106. Optionally, a drain outlet 142 can be provided in the sidewall 118 of the cylindrical section 102 above the drain plate 140 to enhance draining of liquids and solids from the drain plate 140. Draining excess liquids and solids removed by the reverse flow cyclone 124 through the drain outlet 142 can prevent excessive pressure build due to liquid head on the drain plate 140.

Gas, liquids, and solids enter the apparatus 100 at the feed inlet 116. A support plate 144 at least partially separates the feed section 146 of the apparatus, which is a lower part of the cylindrical portion 102 of the vessel 101 defined between the support plate 144 and the drain plate 140, from the bulk separation section 148 in the conical portion 104 of the vessel 101. The drain plate 140 is typically located between the rotation structure 130 and the openings 138. In the cross-section of FIG. 1, the support plate 144 is shown contacting the sidewall 118 of the vessel 101 on opposite sides thereof, but the support plate 144 typically does not contact the sidewall 118 of the vessel 101 around the entire circumference thereof. Thus, material charged to the apparatus 100 at the feed inlet 116 move from the feed section 146, past the support plate 144 between the support plate 144 and the sidewall 118, to drop into the bulk separation section 148. As the feed drops into the bulk separation section 148, rotation may begin as the liquids and solids flow out of the reject outlet 120. If rotation is not desired, an optional vortex breaker 149 may be provided at the reject outlet 120. Rotation of the liquids and solids coupled with decreasing diameter in the conical portion 104 separates the gas into a central column and starts rotation of the gas. If rotation is suppressed in the conical section 106, gas flows toward the center of the conical section 106 under pressure gradient. The gas then flows toward the second end 128 of the axial cyclone under ambient and/or rotational pressure gradient.

The reverse flow cyclone 124 has an entrance fixture 154 that is cup-shaped or cone-shaped. The entrance fixture 154 is coupled at the second end 128 of the reverse flow cyclone 124 and has a circular cross-section. The entrance fixture 154 has a reduced diameter opening, and the diameter of the entrance fixture 154 declines smoothly toward the reduced diameter opening. The entrance fixture 154 is thus tapered toward the reduced diameter opening. The taper may be linear, in which case the entrance fixture 154 is conical, or the taper may be non-linear, in which case the entrance fixture 154 may be cup-shaped. If gas entering the entrance fixture 154 is rotating, Rotation of the gas entering the entrance fixture 154 provides initial separation of residual liquids and solids from the gas along the walls of the entrance fixture 154, which drain downward out of the entrance fixture 154 back to the conical portion 106 of the apparatus 100. Gas continues upward into the optional rotation structure 130, which is located proximate to the entrance fixture 154, and which provides additional rotation to the gas. The rotating gas continues flowing upward in the reverse flow cyclone 124 under positive pressure gradient from the second end 128 to the first end 126 of the reverse flow cyclone 124. Residual liquids and solids continue separating from the rotating gas along the walls of the flow section 136, flowing out of the reverse flow cyclone 124 through the openings 138 onto the drain plate 140.

The reverse flow cyclone 124 may have an optional porous member 156 disposed in the reverse flow cyclone 124 at the first end 126 thereof. The porous member 156 is a cylindrical member that occupies the open space between the walls of the reverse flow cyclone 124 at the first end 126 thereof. The porous member 156 may be a mesh material, sponge material, or other high surface area porous packing material. Residual liquids and solids separate from the gas in the porous member 156, nucleating on surfaces thereof, run down through the porous member 156, and exit the reverse flow cyclone 124 through the opening 138, collecting on the drain plate 140 with the rest of the liquids. The clean dry gas exits the reverse flow cyclone 124 at the first end 126 thereof into the top 104, and passes through the gas outlet 122. An optional filter 158 may also be coupled to the gas outlet 122 for extra drying and/or solids removal.

The support plate 144 may support the reverse flow cyclone 124 at the second end 128. The support plate 144 is coupled to the cylindrical section 102 at the sidewall 118, and as noted above the support plate 144 does not contact the walls of the vessel 101 around the entire circumference thereof, so there are openings between the support plate 144 and the walls of the vessel 101 for fluid flow past the support plate 144 from the feed section 146 to the bulk separation section 148 to access the entrance fixture 154 at the second end 128 of the reverse flow cyclone 124. The support plate 144 may be coupled to the sidewall 118 by brackets (not shown) that directly couple the support plate 144 to the sidewall 118. Alternately, support rails (not shown) may be coupled to the sidewall 118 using brackets or supports connected to the sidewall 118, and the support plate 144 may be coupled to the support rails. The reverse flow cyclone 124 may have a flange (not shown) by which the reverse flow cyclone 124 can be bolted to the support plate 144. The reverse flow cyclone 124 may, additionally or alternately, be supported by the drain plate 140 in a similar fashion.

The feed inlet 116 may be oriented along a radius of the cylindrical section 102 such that an axis of the feed inlet 116, defining a flow path of feed through the feed inlet, lies on the radius of the cylindrical section 102. Alternately, the feed inlet 116 may be angled in an azimuthal direction with respect to the radius of the cylindrical section 102 such that the axis of the feed inlet 116 forms an azimuth angle with the radius of the cylindrical section 102. Feeding material to the cylindrical section 102 at an azimuth to the radius of the cylindrical section 102 can impart an initial rotation to the material charged to the apparatus 100. In some embodiments, the feed inlet 116 may be oriented tangentially to the cylindrical section 102.

The support plate 144 also functions to prevent liquids and solids separated from the feed recycling into the feed section, and helps to maintain a pressure differential between the feed section 146 and the bulk separation section 148. In general, the apparatus 100 is separated into four sections, including the bulk separation section 148, the feed section 146, a drain section 160, and a top section 162. As described above, the feed section 146 is separated from the bulk separation section 148 by the support plate 144. The drain section 160 is separated from the feed section 146 by the drain plate 140. The top section 162 is separated from the drain section 160 by a top plate 164. The top plate 164 only has an opening that fits the first end 126 of the reverse flow cyclone 124 so that the gas released into the top section 162 does not re-entrain liquids and solids from the drain section 160. The reverse flow cyclone 124 is generally oriented such that the entrance fixture 154 is located in the bulk separation section 148 to admit wet gas for separation. The optional rotation structure 130 is typically located near the support plate 144, and the flow section 136 goes from the feed section 146 through the drain plate 140 to the drain section 160, where the openings 138 and the optional porous member 156 further separate residual liquids and solids for collection on the drain plate 140. The first end 126 of the reverse flow cyclone 124 may end at the top plate 164, or may extend beyond the top plate 164 into the top section 162. It should be noted that the reverse flow cyclone 124 can also be supported, alternately or additionally, by the top plate 164 in a manner similar to the support plate 144 and/or the drain plate 140.

A gas inlet nozzle 172 is arranged at the entrance of the reverse flow cyclone 124 near the entrance fixture 154. The gas inlet nozzle 172 is a conical member with a first opening 166 facing the entrance fixture 154 and a second opening 168 facing away from the entrance fixture 154. The first and second openings 166 and 168 may be the same dimension or, as shown here, the second opening 168 may have dimension larger than the first opening 166.

The gas inlet nozzle 172 functions to attract gas flowing downward in the bulk separation section 148 into the reverse flow cyclone 124. Material flowing downward past the gas inlet nozzle 172 creates a slight vacuum in the gas inlet nozzle 172 due to the Bernoulli Effect. The slight vacuum separates gas from downward flowing material in the bulk separation section 148. The gas then flows upward through the gas inlet nozzle 172 to the entrance fixture 154. In the event the gas inlet nozzle 172 has a conical flow pathway that shrinks from the second opening 168 to the first opening 166, supplementary cyclonic separation can occur in the gas inlet nozzle 172. Gas flows generally from the first opening 166 of the gas inlet nozzle 172 into the entrance fixture 154 of the reverse flow cyclone 124. The gas inlet nozzle 172 may be supported by one or more supports 170 that attach to an external surface of the entrance fixture 154 and to an external surface of the gas inlet nozzle 172.

Figure 2A:
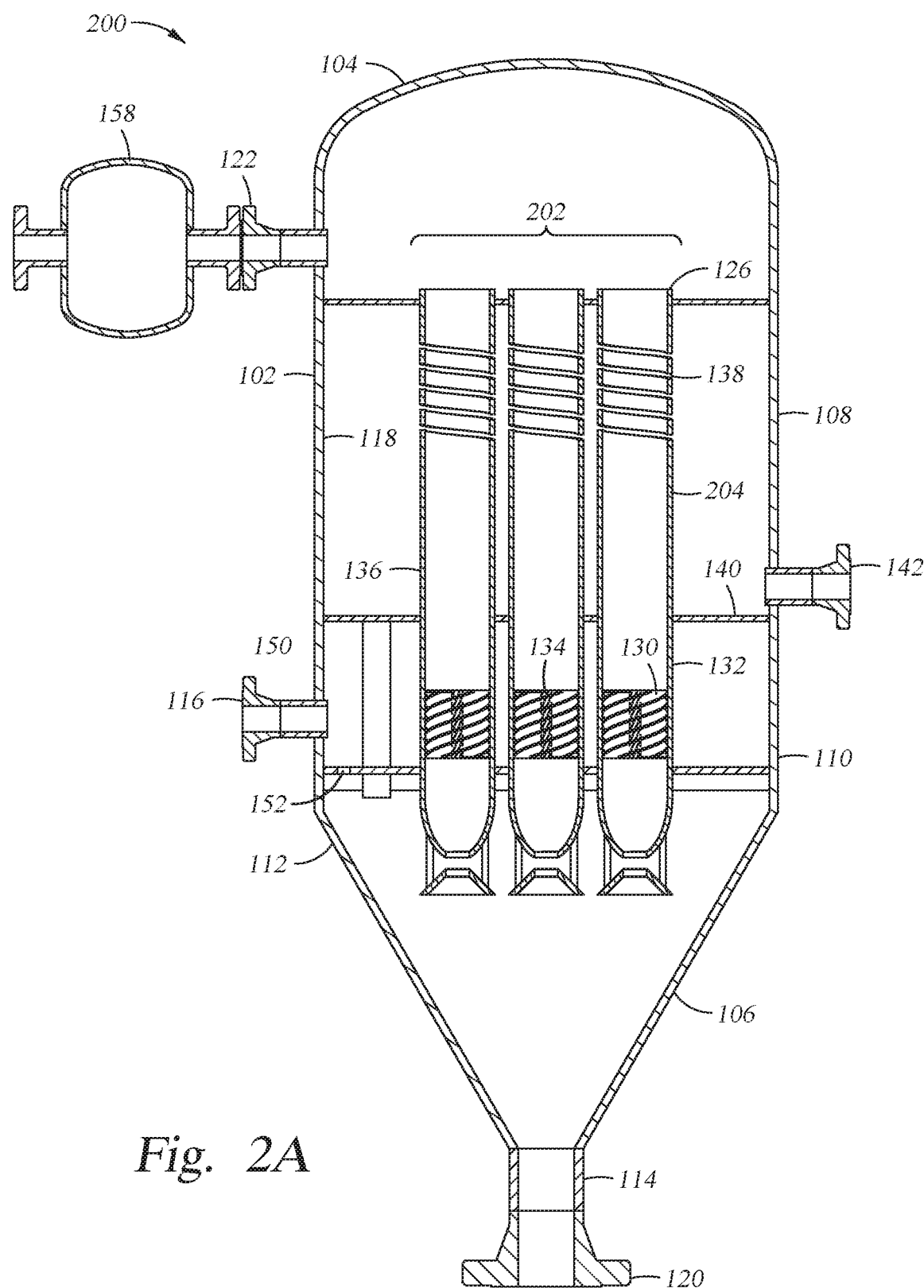
FIG. 2A is a cross-sectional view of a separation apparatus according to another embodiment.

FIG. 2A is a cross-sectional view of a separation apparatus 200 according to another embodiment. The separation apparatus 200 is generally similar to the separation apparatus 100, except that an axial cyclone insert 202 is used instead of the single axial cyclone 124 of FIG. 1. Similar elements in FIGS. 1 and 2A are given the same reference numerals. In general, in this application, the same reference numeral is used to refer to the same, or similar, element among different figures. The axial cyclone insert 202 includes a plurality of axial cyclones 204, each of which may be the same as the axial cyclone 124, or may be different according to the variations explained in connection with FIG. 1. Each of the axial cyclones 204 may have the optional rotation structure 130, and each has openings 138 near the first end 126 of each axial cyclone 204, substantially as described above in connection with FIG. 1. The axial cyclones 204 are arranged in a pattern to capture gas flow rising through the apparatus 200 toward the gas outlet 122. Here, three axial cyclones 204 are visible. Any number of axial cyclones 204 may be used, subject to space availability within the apparatus 200 and gas flow and separation requirements. More axial cyclones 204 will result in more efficient removal of fine solid and liquid particles. As in FIG. 1, an optional filter 158 can be coupled to the gas outlet 122.

Figure 2B:
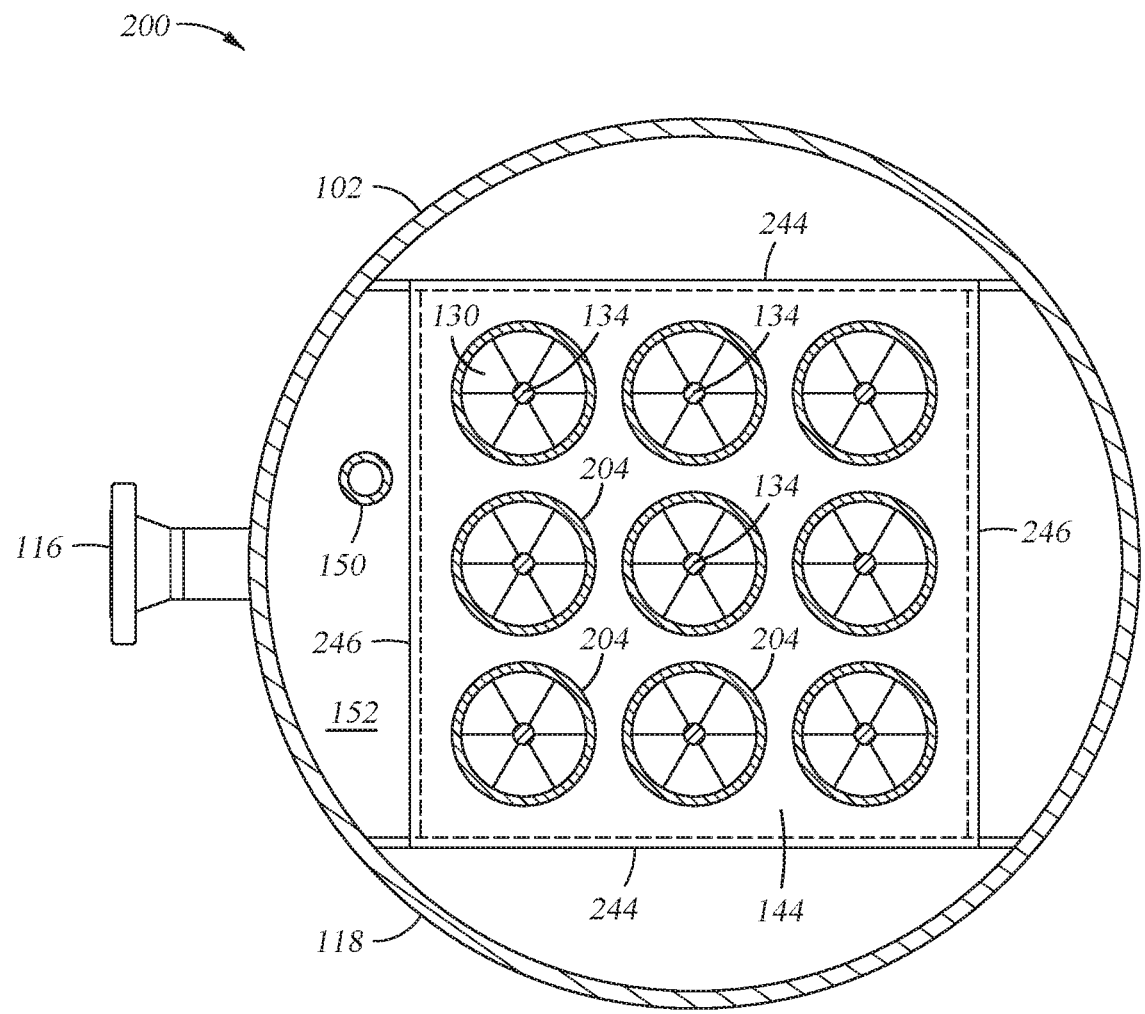
FIG. 2B is a top cross-sectional view of the separation apparatus of FIG. 2A.

FIG. 2B is a top cross-sectional view of the apparatus 200 of FIG. 2A. In this view, nine axial cyclones 204 are visible in the axial cyclone insert 202, arranged in a square 3×3 pattern. This cross-section is taken at a location that is between the drain plate 140 (FIG. 2A) and the rotation structures 130. The nine axial cyclones 204 are supported by the separator plate 144, which is in turn supported from four support rails 242. Two main support rails 244 are coupled to the sidewall 118 of the apparatus 200, and two cross support rails 246 are coupled between the two main support rails 244. The support rails 244 and 246 support the support plate 240, which in turn supports the nine axial cyclones 204. Here, the feed opening 152 is located between the sidewall 118, at the location of the feed inlet 116, and the nearest support rail 246.

As noted above, any number of axial cyclones can be positioned in the apparatus 200 by providing main and cross supports, and support plates, in the cylindrical portion 102. It should be noted that other methods of supporting the axial cyclones 204 may be used. For example, each axial cyclone 204 may be separately fastened to the separator plate 144, for example by bolting or welding to the separator plate 144. An axial cyclone insert may include a group of axial cyclones, as illustrated in FIG. 2B, and may be fastened together using a support structure, such as a box or rack. Each axial cyclone 204 may be bolted to the support structure, which in turn may be bolted to the separator plate 144. Alternately, each axial cyclone 204 individually, or a support structure for an axial cyclone insert, may be suspended from the sidewall 118 near the first end 108 of the cylindrical portion 102, or from the top 104 in any convenient manner. For example, the top plate 164 (FIG. 1) may have holes sized to fit an axial cyclone, and may be attached to the sidewall 118, and axial cyclones having a small lip or flange at the first end 126 thereof can be lowered into the holes and fastened to the top plate 164, thus suspending the axial cyclones 204 from their respective first ends 126.

Figure 2C:
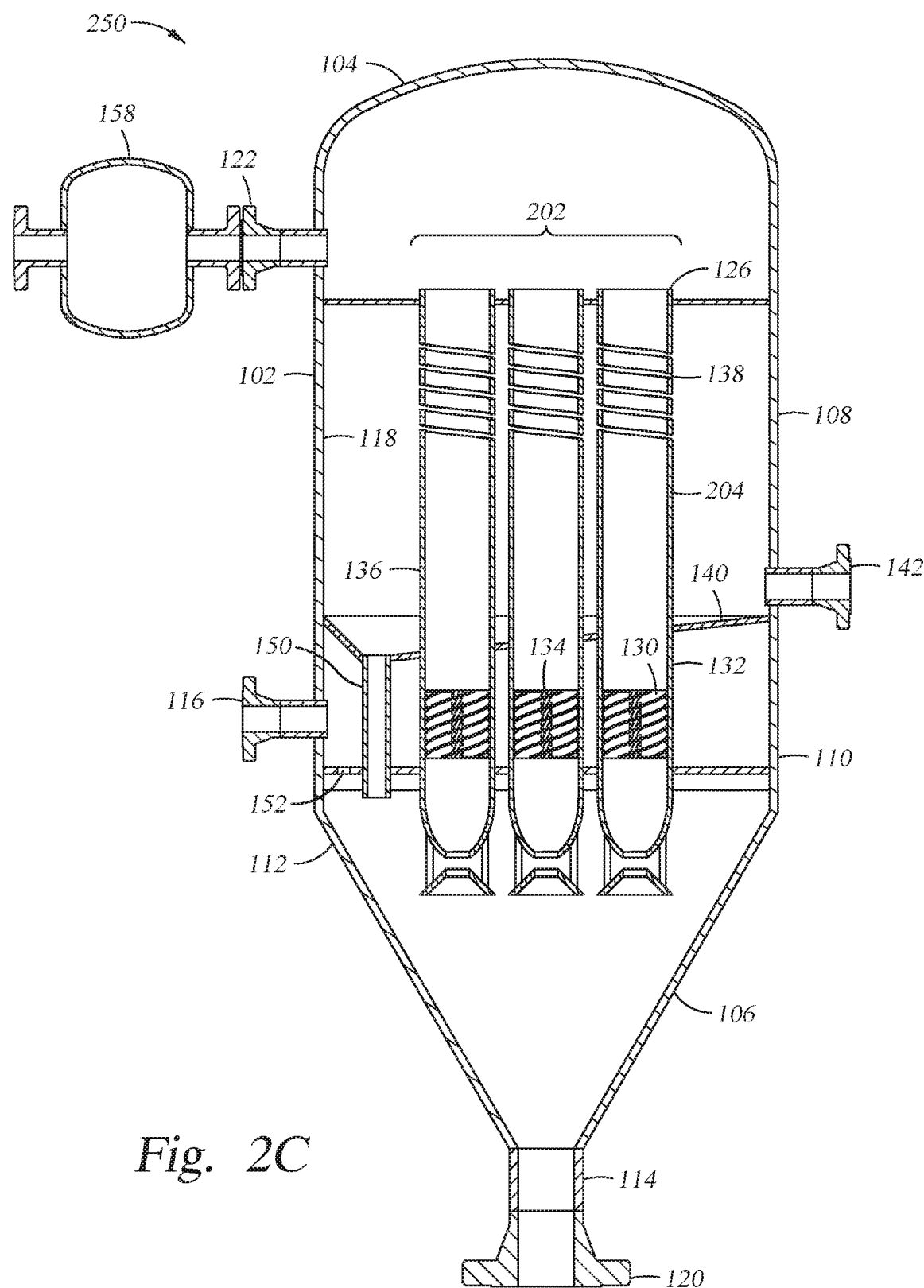
FIG. 2C is a cross-sectional view of a separation apparatus according to another embodiment.

FIG. 2C is a cross-sectional view of a separation apparatus 250 according to another embodiment. The separation apparatus 250 is generally similar to the separation apparatus 200 of FIG. 2A, except that the drain plate 140 of the separation apparatus 250 is not flat, but is slanted toward the drain passage 150 to facilitate draining liquids, with suspended solids, to the conical portion 106. The drain plate 140 is here attached to the sidewall 118 at a constant elevation defining a horizontal plane. The drain plate 140 slopes smoothly downward from the sidewall 118 to the drain passage 150, which is located between the axial cyclone insert 202 and the sidewall 118. The separation apparatus 250 of FIG. 2C also features the optional drain outlet 142 in the event liquids and solids do not drain fast enough through the drain passage 150. It should be noted that a slanted drain plate such as that shown in FIG. 2C can also be used in the apparatus 100 of FIG. 1.

While the foregoing is directed to embodiments of the present invention, other and further embodiments of the present disclosure may be devised without departing from the basic scope thereof, and the scope thereof is determined by the claims that follow.

What is claimed is:

1. A separator apparatus, comprising:
a vessel comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof;
   a reverse flow cyclone disposed in the cylindrical section, the reverse flow cyclone oriented with a first end located proximate to the top and a second end opposite the first end and having a tapered entrance fixture at the second end, and having a wall with a plurality of openings located between the first end of the reverse flow cyclone and a midpoint of the reverse flow cyclone; and
   a drain plate coupled to the cylindrical section below the openings of the reverse flow cyclone.

2. The separator apparatus of claim 1, further comprising a support plate located between the feed inlet of the cylindrical section and the second end of the reverse flow cyclone.

3. The separator apparatus of claim 2, further comprising a drain passage from the drain plate to the support plate.

4. The separator apparatus of claim 3, further comprising a drain outlet in the cylindrical section above the drain plate.

5. The separator apparatus of claim 3, wherein the drain plate is coupled to a sidewall of the cylindrical section, and the drain plate is sloped from the sidewall to the drain passage.

6. The separator apparatus of claim 1, wherein the reverse flow cyclone further comprises a porous member disposed in the reverse flow cyclone at the first end thereof.

7. The separator apparatus of claim 1, further comprising a gas inlet nozzle located at the tapered entrance fixture.

8. The separator apparatus of claim 1, wherein the tapered entrance fixture is cup-shaped.

9. The separator apparatus of claim 1, wherein the reverse flow cyclone includes a rotation structure.

10. A separator apparatus, comprising:
a vessel comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof;
a reverse flow cyclone insert disposed in the cylindrical section, the reverse flow cyclone insert having a plurality of reverse flow cyclones, each oriented with a first end located proximate to the top and a second end opposite the first end, and each having a tapered entrance fixture at the second end, and each having a wall with a plurality of openings located between the first end a midpoint of the reverse flow cyclone; and
a drain plate coupled to the cylindrical section below the openings of the reverse flow cyclone insert.

11. The separator apparatus of claim 10, further comprising a support plate located between the feed inlet of the cylindrical section and the second ends of the reverse flow cyclones, wherein the support plate supports the reverse flow cyclone insert.

12. The separator apparatus of claim 11, further comprising a drain passage from the drain plate to the support plate.

13. The separator apparatus of claim 12, wherein the drain plate is coupled to a sidewall of the cylindrical section, and the drain plate is sloped from the sidewall to the drain passage.

14. The separator apparatus of claim 12, further comprising a drain outlet in the cylindrical section above the drain plate.

15. The separator apparatus of claim 10, wherein each reverse flow cyclone has a porous member disposed in the reverse flow cyclone at the first end thereof.

16. The separator apparatus of claim 10, wherein each reverse flow cyclone further comprises a gas inlet nozzle located at the tapered entrance fixture.

17. The separator apparatus of claim 10, wherein each tapered entrance fixture is cup-shaped.

18. The separator apparatus of claim 10, wherein each reverse flow cyclone includes a rotation structure.

19. A separator apparatus, comprising:

a vessel comprising a cylindrical section, a conical section, and a top, the cylindrical section having a first end connected to the top and a second end opposite the first end, the conical section having a first end connected to the second end of the cylindrical section and a second end opposite the first end, the first end of the conical section having a first diameter, the second end of the conical section having a second diameter, the first diameter being larger than the second diameter, the cylindrical section having a feed inlet, the top having a gas outlet, and the conical section having a reject outlet at the second end thereof;

a reverse flow cyclone insert disposed in the cylindrical section, the reverse flow cyclone insert having a plurality of reverse flow cyclones, each oriented with a first end located proximate to the top and a second end opposite the first end and having a tapered entrance fixture at the second end, and each having a wall with a plurality of openings located between the first end a midpoint of the reverse flow cyclone;

a sloped drain plate coupled to the cylindrical section below the openings of the reverse flow cyclone insert; and a support plate located between the feed inlet of the cylindrical section and the second ends of the reverse flow cyclones, wherein the support plate supports the reverse flow cyclone insert.

20. The separator apparatus of claim 19, wherein each reverse flow cyclone has a porous member disposed in the reverse flow cyclone at the first end thereof, and each reverse flow cyclone further comprises a gas inlet nozzle located at the tapered entrance fixture.

* * * * *